United States Patent
Fischer et al.

[11] Patent Number: 6,164,685
[45] Date of Patent: Dec. 26, 2000

[54] DEPLOYMENT DOOR FOR AIR BAG MODULE

[75] Inventors: Kurt F. Fischer, Oxford; Paul M. Lange, St. Clair Shores; Kathleen K. Stawara, Clarkston; Paul R. Walsh, Oakland, all of Mich.

[73] Assignee: TRW Vehicle Safety Systems Inc., Lyndhurst, Ohio

[21] Appl. No.: 09/146,793

[22] Filed: Sep. 3, 1998

[51] Int. Cl.[7] ............................ B60R 21/20; B60R 21/22
[52] U.S. Cl. ........................ 280/728.3; 280/732
[58] Field of Search ................................ 280/728.3, 732, 280/730.1

[56] References Cited

U.S. PATENT DOCUMENTS

| | | | |
|---|---|---|---|
| 3,794,349 | 2/1974 | Fuller | 280/732 |
| 5,211,421 | 5/1993 | Catron et al. | |
| 5,322,324 | 6/1994 | Hansen et al. | |
| 5,375,876 | 12/1994 | Bauer et al. | |
| 5,527,065 | 6/1996 | Saberan et al. | 280/728.3 |
| 5,533,748 | 7/1996 | Wirt et al. | |
| 5,588,674 | 12/1996 | Yoshimura et al. | 280/732 |
| 5,829,778 | 11/1998 | Woolley et al. | 280/728.3 |

*Primary Examiner*—Peter C. English
*Attorney, Agent, or Firm*—Tarolli, Sundheim, Covell, Tummino & Szabo L.L.P.

[57] ABSTRACT

An occupant safety apparatus (10) is for mounting on an instrument panel (20) of a vehicle (12) which extends generally rearward in the vehicle from the vehicle windshield (22) and which defines a deployment opening (60). The safety apparatus (10) comprises an inflatable protection device (44) having an uninflated condition and an inflated condition. The safety apparatus (10) also comprises an inflator (46) for, when actuated, inflating the protection device (44). A door (70) covers substantially the entire deployment opening (60). The door (70) has a first edge portion (72) disposed closer to the vehicle windshield (22) and a second edge portion (74) disposed farther from the vehicle windshield. A hinge (76) is connected to the second edge portion (74) of the door adjacent the instrument panel (20). The hinge (76) supports the door (70) on the instrument panel (20) for pivotal movement about the hinge between a closed condition covering substantially the entire deployment opening (60) and an open condition in which the second edge portion (74) of the door remains connected with the hinge and adjacent the instrument panel and the first edge portion (72) of the door is spaced farther from the instrument panel than in the closed condition.

13 Claims, 2 Drawing Sheets

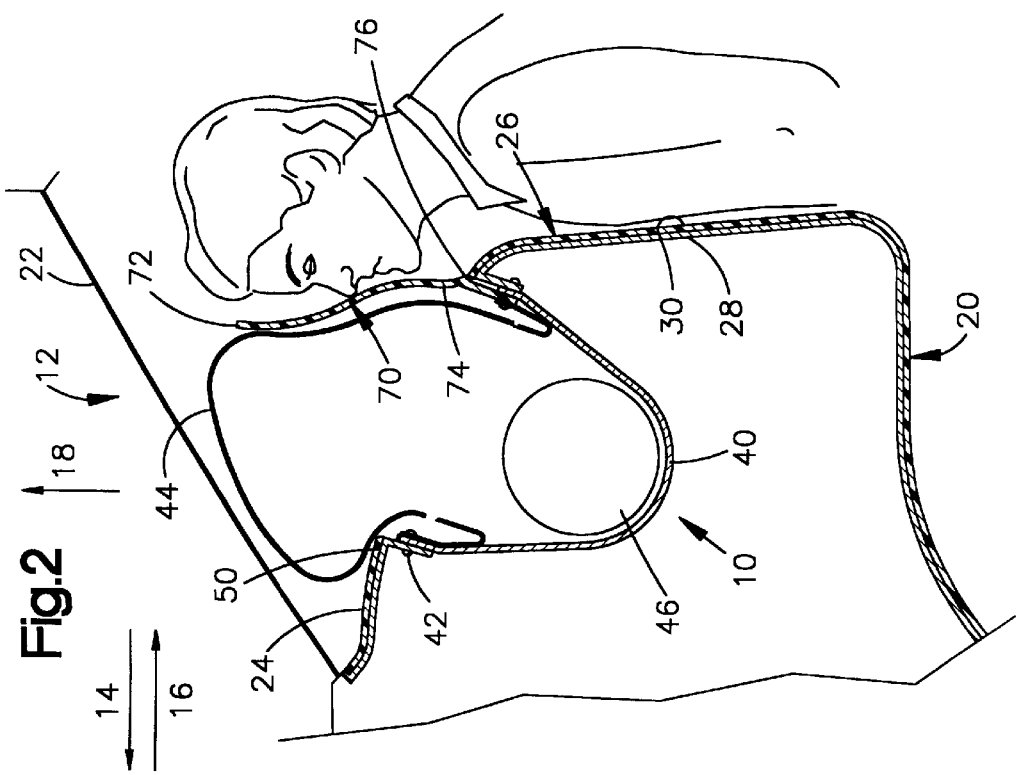
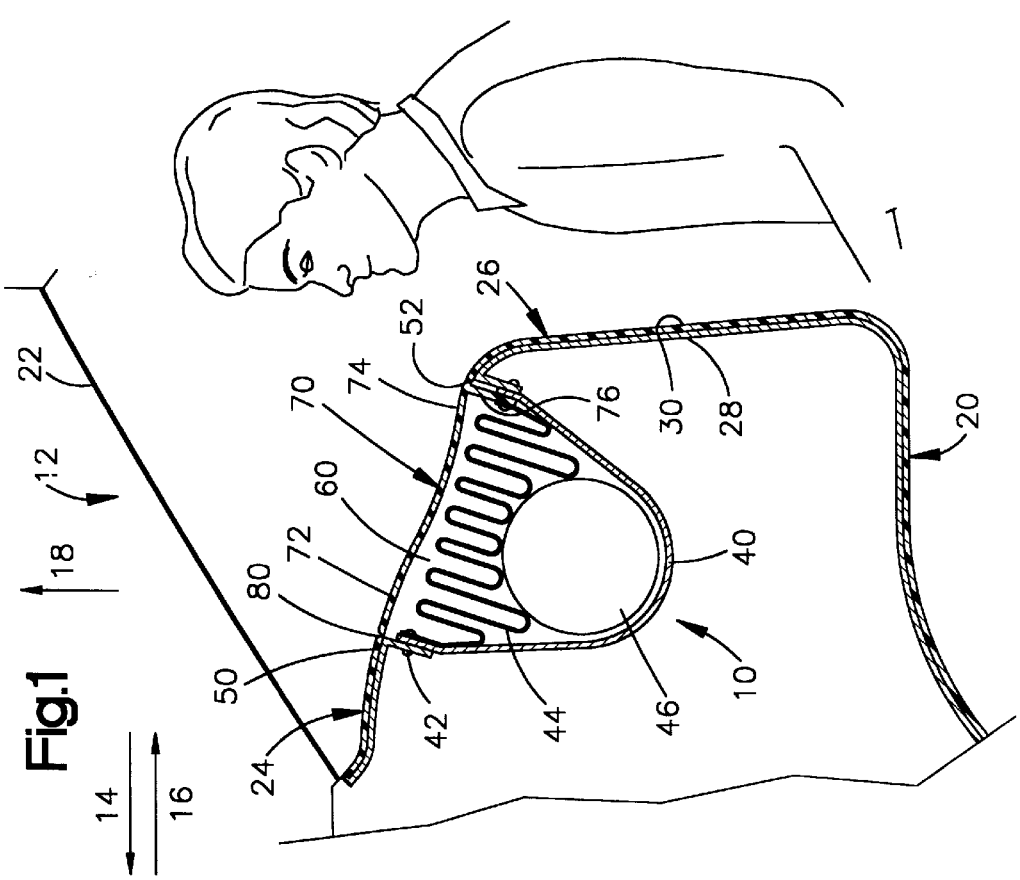

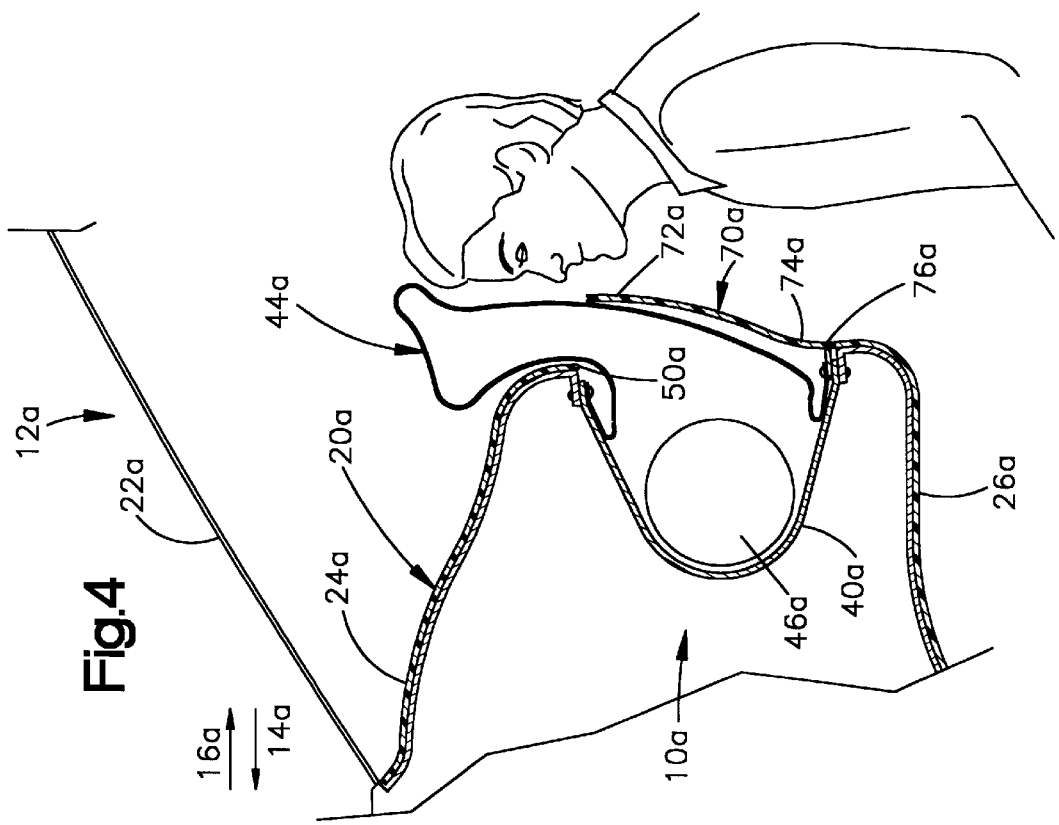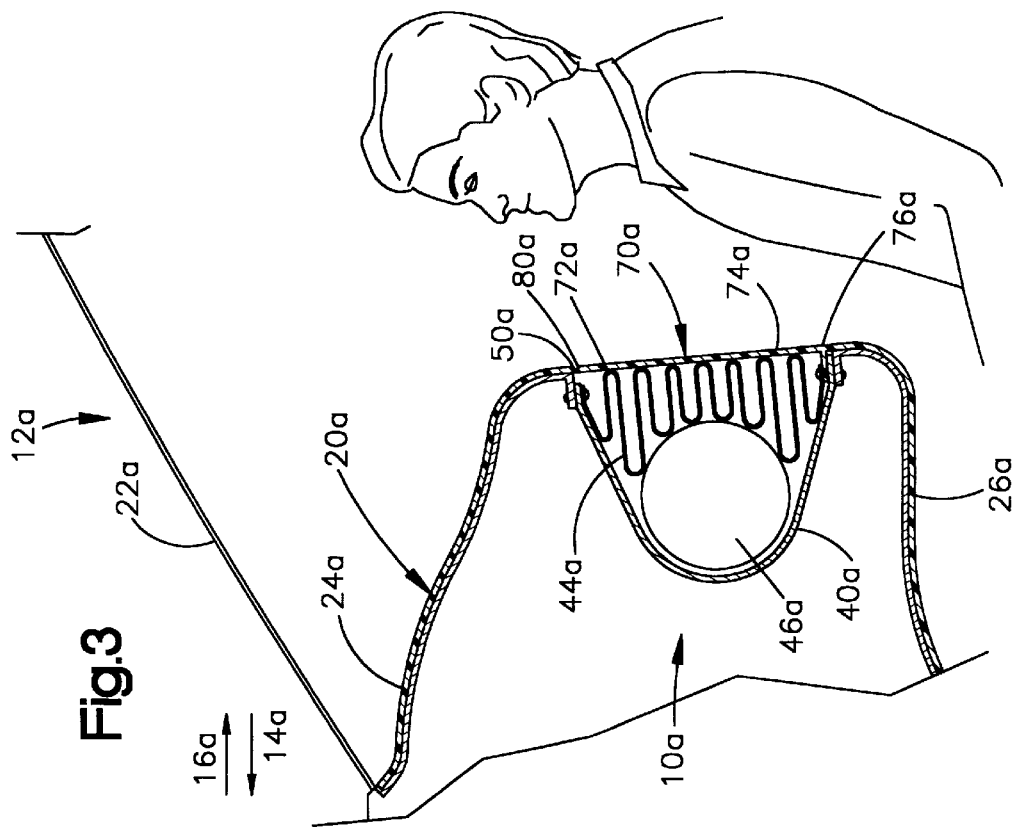

DEPLOYMENT DOOR FOR AIR BAG MODULE

BACKGROUND OF THE INVENTION

1. Technical Field

The present invention relates to a vehicle occupant safety apparatus and, in particular, to an air bag module including a deployment door for covering an opening through which an air bag is inflatable to help protect a vehicle occupant.

2. Description of the Prior Art

It is known to inflate an air bag to help protect a vehicle occupant in the event of a vehicle collision. To help protect a front seat passenger of a vehicle, an air bag is typically mounted in the instrument panel of the vehicle, together with an inflator, at a location forward of the occupant's seat. A deployment opening in the instrument panel is covered by a movable deployment door.

The inflator is actuated in the event of a vehicle collision to inflate the air bag through the deployment opening. The deployment door pivots open under the force of the inflating air bag, to enable inflation of the air bag into a position to help protect the vehicle occupant.

If an occupant is in close proximity to the instrument panel when the inflator is actuated, the deployment door can engage the occupant and be blocked from pivoting out of the way of the inflating air bag. The door might then direct the inflating air bag to inflate against the occupant's head and neck, perhaps while moving in an upward direction. This can undesirably increase the loads on the occupant's head and neck.

SUMMARY OF THE INVENTION

The present invention is an occupant safety apparatus for mounting on an instrument panel of a vehicle, the instrument panel extending generally rearward in the vehicle from the vehicle windshield and defining a deployment opening. The safety apparatus comprises an inflatable vehicle occupant protection device having an uninflated condition and an inflated condition. The safety apparatus also comprises an inflator for, when actuated, inflating the protection device, and a door for covering substantially the entire deployment opening in the instrument panel. The door has a first edge portion disposed closer to the vehicle windshield and a second edge portion disposed farther from the vehicle windshield. A hinge is connected to the second edge portion of the door adjacent the instrument panel. The hinge supports the door for pivotal movement about the hinge relative to the instrument panel between a closed condition covering substantially the entire deployment opening and an open condition in which the second edge portion of the door remains connected with the hinge adjacent the instrument panel and the first edge portion of the door is spaced farther from the instrument panel than in the closed condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic illustration of a vehicle safety apparatus in accordance with a first embodiment of the present invention, shown in a condition prior to actuation;

FIG. 2 is a view similar to FIG. 1 showing the safety apparatus of FIG. 1 in a condition after actuation;

FIG. 3 is a schematic illustration of a vehicle safety apparatus in accordance with a second embodiment of the present invention, shown in a condition prior to actuation; and FIG. 4 is a view similar to FIG. 3 showing the safety apparatus of FIG. 3 in a condition after actuation.

DESCRIPTION OF PREFERRED EMBODIMENTS OF THE INVENTION

The present invention relates to a vehicle safety apparatus for protecting an occupant of a vehicle in the event of a vehicle collision. The present invention is applicable to various vehicle safety apparatus constructions. As representative of the present invention, FIG. 1 illustrates a vehicle safety apparatus or air bag module 10.

The air bag module 10 is located on the front passenger side of a vehicle 12. The forward direction of travel of the vehicle 12 is indicated by the arrow 14 and the rearward direction of travel is indicated by the arrow 16. A vertically upward direction in the vehicle 12 is indicated by the arrow 18.

The vehicle 12 includes an instrument panel 20, only portions of which are shown. The windshield 22 of the vehicle extends upward and rearward from the forward edge of the instrument panel. The instrument panel 20 includes an upper or front portion 24 which slopes downward and rearward from the base of the windshield 22. A lower or rear portion 26 of the instrument panel 20 extends generally vertically downward from the rear edge of the front portion 24. The instrument panel 20 as shown is made from a metal substrate 28 and an overlying plastic material covering 30, but may alternatively be made in any known manner.

The vehicle safety apparatus 10 includes a reaction canister or housing 40 which is supported on the vehicle instrument panel 20 by fasteners 42. The housing 40 encloses and supports an air bag indicated schematically at 44 and an inflator indicated schematically at 46. The inflator 46 is a known inflator which, upon actuation, uses either gas generating material or stored gas or stored gas heated by ignitable material to inflate the air bag 44 into a position to help protect a vehicle occupant. The air bag 44 is a known air bag which is folded and stored in a known manner in the housing 40. The housing 40 may be a portion of the instrument panel 20.

The upper portion 24 of the instrument panel 20 has upper and lower edge surfaces 50 and 52, respectively, and side edge surfaces (not shown) which define a deployment opening 60 in the instrument panel 20. In the embodiment shown in FIGS. 1 and 2, the deployment opening 60 faces generally upward in the vehicle, toward the windshield 22.

The air bag module 10 includes a single door panel 70. The door panel 70 covers substantially the entire deployment opening 60. It should be understood that the module 10 could, alternatively, include two doors, with one substantially larger than the other, for covering the deployment opening 60. In that case, the larger of the two doors would be hinged in the manner of the single door panel 70, as described below.

The door panel 70 may be made from a plastic material similar to the covering 30 of the instrument panel 20. The door panel 70 has a forward or upper edge portion 72 disposed closer to the vehicle windshield 22 and a lower or rear edge portion 74 disposed farther from the windshield, that is, closer to the vehicle occupant. The upper edge portion 72 of the door panel 70 is releasably connected with the upper edge surface 50 on the instrument panel 20 by a rupturable portion or tear seam 80.

A hinge 76 supports the door panel 70 on the instrument panel 20. The hinge 76 is preferably molded as one piece with the door panel 70. The hinge 76 connects the lower or rear edge portion 74 of the door panel 70 with the lower portion 26 of the instrument panel 20. The hinge 76 and door panel 70 may be made in any one of many known manners for use with and incorporation in the instrument panel 20.

As is known, the door 70 could alternatively be mounted on the housing 40. In that case, the hinge 76 would be connected between the door panel 70 and the housing 40. The upper edge portion 72 of the door panel 70 would be releasably connected with the housing 40.

In the event of a vehicle collision for which it is desired to inflate the air bag 44, the inflator 46 is actuated in a known manner by a collision sensor (not shown). The inflator 46 directs inflation fluid into the air bag 44.

The inflating air bag 44 presses outwardly against the door panel 70 and causes the tear seam 80 to rupture. The door panel 70 pivots relative to the instrument panel 20 from the condition shown in FIG. 1 to the condition shown in FIG. 2. The door panel 70 pivots in a clockwise direction as viewed in FIG. 1 about the hinge 76, into a partially open condition as shown in FIG. 2.

FIG. 2 illustrates the position of the air bag 44 and of the door panel 70 at an early stage during inflation and deployment of the air bag 44, in which the door panel is partially open. The air bag 44 subsequently inflates to a fully inflated condition to help protect the vehicle occupant.

When the door panel 70 is in the partially open condition, the lower edge portion 74 of the door panel remains hingedly connected with the instrument panel 20. The upper edge portion 72 of the door panel 70 is spaced apart from the instrument panel 20, thereby uncovering the deployment opening 60 and enabling inflation of the air bag 44. The air bag 44 inflates and deploys through the deployment opening 60 in the instrument panel 20 into a position to help protect the vehicle occupant.

Because the door panel 70 is hinged along its lower edge portion 74, the upper edge portion 72 of the door panel pivots rearward and upward in the vehicle 12. If an occupant is in close proximity to the instrument panel 20 when the inflator 46 is actuated, as is illustrated in FIGS. 1 and 2, the door panel 70 can contact the chin or other portion of the occupant. If this occurs, the orientation of the door panel 70 prevents the air bag 44 from inflating against the occupant's head and neck while moving in an upward direction. Instead, the air bag 44 is directed by the door panel 70 to inflate away from the head and neck of the occupant, in the upward direction 18 in the vehicle 12.

FIGS. 3 and 4 illustrate a vehicle safety apparatus or air bag module 10a in accordance with a second embodiment of the present invention. The module 10a is generally similar in construction to the module 10 (FIGS. 1 and 2), and similar parts are given similar reference numerals with the suffix "a" added for clarity.

The module 10a (FIGS. 3 and 4) is a "mid mount" configuration rather than the "top mount" configuration of the module 10 (FIGS. 1 and 2). Specifically, the module 10a is mounted in the lower portion 26a of the instrument panel 20a. The air bag 44a inflates generally horizontally (in the rearward direction 16a) in the vehicle 12a rather than vertically upward as with the "top mount" configuration of the module 10 shown in FIGS. 1 and 2.

The air bag module 10a (FIG. 3) includes a single door panel 70a for covering all or substantially all of the deployment opening 60a. A hinge 76a connects the lower or rear edge portion 74a of the door panel 70a with the lower portion 26a of the instrument panel 20a. The upper edge portion 72a of the door panel 70a, which is closer to the windshield 22a than the lower edge portion 74a of the door panel, is releasably connected with the upper edge surface 50a on the instrument panel 20a by a tear seam 80a.

The module 10a could alternatively include two doors as described above with reference to FIGS. 1 and 2. In addition, the door panel 70a could be mounted on the housing 40a rather than on the instrument panel 20a.

Upon actuation of the inflator 46a, the inflating air bag 44a presses outwardly against the door panel 70a and causes the tear seam 80a to rupture. The door panel 70a pivots relative to the instrument panel 20a from the condition shown in FIG. 3 to the condition shown in FIG. 4. The door panel 70a pivots in a clockwise direction as viewed in FIG. 3 about the hinge 76a, into a partially open condition as shown in FIG. 4. If the door panel 70a is stopped in this position by contact with the vehicle occupant, as shown in FIG. 4, the orientation of the door panel directs the air bag 44a to inflate away from the head and neck of the vehicle occupant.

From the above description of the invention, those skilled in the art will perceive improvements, changes and modifications in the invention. Such improvements, changes and modifications within the skill of the art are intended to be covered by the appended claims.

What is claimed is:

1. An occupant safety apparatus for mounting on an instrument panel of a vehicle, the instrument panel extending generally rearward in the vehicle from the vehicle windshield and defining a deployment opening, said safety apparatus comprising:

an inflatable vehicle occupant protection device having an uninflated condition and an inflated condition, said occupant protection device restraining a vehicle occupant while in said inflated condition;

an inflator for, when actuated, inflating said protection device;

a door for covering substantially the entire deployment opening in the instrument panel, said door having a first edge portion disposed closer to the vehicle windshield and a second edge portion disposed farther from the vehicle windshield; and a hinge connected to said second edge portion of said door adjacent the instrument panel, said hinge supporting said door for pivotal movement about said hinge relative to the instrument panel between a closed condition covering substantially the entire deployment opening and an open condition in which said second edge portion of said door remains connected with the hinge and adjacent the instrument panel and said first edge portion of said door is spaced farther from the instrument panel than in the closed condition, said door having a first portion which may engage the vehicle occupant and overlie a chin and neck portion of the vehicle occupant as said door moves to said open condition, said door further having a second portion for directing said occupant protection device away from the chin and neck portion of the vehicle occupant when said door overlies the chin and neck portion of the vehicle occupant.

2. An apparatus as set forth in claim 1 wherein said second edge portion of said door is a rear edge portion of said door and said inflator is actuatable to inflate said protection device in a generally upward direction in the vehicle.

3. An apparatus as set forth in claim 2 wherein said first edge portion of said door is a forward edge portion of said door and pivots rearward and upward during movement between the closed condition and the open condition.

4. An apparatus as set forth in claim 1 wherein said second edge portion of said door is a lower edge portion of said door and said inflator is actuatable to inflate said protection device in a generally rearward direction in the vehicle.

5. An apparatus as set forth in claim 4 wherein said first edge portion of said door is an upper edge portion of said door and pivots rearward and downward during movement between the closed condition and the open condition.

6. An apparatus as set forth in claim 1 further comprising a tear seam releasably connecting said first edge portion of said door with the instrument panel.

7. An apparatus as set forth in claim 1 wherein said hinge is molded as one piece with said door.

8. An occupant safety apparatus for mounting on an instrument panel of a vehicle, the instrument panel having an upper portion extending generally rearward in the vehicle from the vehicle windshield and defining a deployment opening facing generally upward in the vehicle, said safety apparatus comprising:

an inflatable vehicle occupant protection device having an uninflated condition, a partially inflated condition, and a fully inflated condition;

an inflator for, when actuated, inflating said protection device in a generally upward direction through the deployment opening;

a door for covering substantially the entire deployment opening, said door having a forward edge portion and a rearward edge portion; and a hinge connected to said rearward edge portion of said door adjacent the upper portion of the instrument panel, said hinge supporting said door for pivotal movement about said hinge relative to the instrument panel between a closed condition covering substantially the entire deployment opening and an open condition in which said rearward edge portion of said door remains connected with the hinge and adjacent the upper portion of the instrument panel and said forward edge portion of said door is spaced farther from the instrument panel than in the closed condition, said door engaging a chin portion of a vehicle occupant while said occupant protection device is in said partially inflated condition, said door having a portion for directing said occupant protection device away from the chin portion.

9. An apparatus as set forth in claim 8 wherein said forward edge portion of said door pivots rearward and upward during movement of said door between the closed condition and the open condition.

10. An apparatus as set forth in claim 8 further comprising a tear seam releasably connecting said forward edge portion of said door with the instrument panel.

11. A vehicle occupant safety apparatus for mounting on a portion of a vehicle instrument panel extending generally vertically in the vehicle and defining a deployment opening, said safety apparatus comprising:

an inflatable vehicle occupant protection device having an uninflated condition, a partially inflated condition, and a fully inflated condition;

an inflator for, when actuated, inflating said protection device in a generally rearward direction through the deployment opening;

a door for covering substantially the entire deployment opening, said door having an upper edge portion and a lower edge portion; and a hinge connected to said lower edge portion of said door adjacent the instrument panel portion, said hinge supporting said door for pivotal movement about said hinge relative to the instrument panel portion between a closed condition covering substantially the entire deployment opening and an open condition in which said lower edge portion of said door remains connected with the hinge and adjacent the instrument panel portion and said upper edge portion of said door is spaced farther from the instrument panel than in the closed condition, said door having an inner surface adjacent said occupant protection device and an outer surface opposite said inner surface, said inner surface of said door directing said occupant protection device vertically away from said hinge when said occupant protection device is in said partially inflated condition, said outer surface of said door contacting a chin portion of a vehicle occupant when said occupant protection device is in said partially inflated condition.

12. An apparatus as set forth in claim 11 wherein said upper edge portion of said door pivots rearward and downward during movement of said door between the closed condition and the open condition.

13. An apparatus as set forth in claim 11 comprising a tear seam releasably connecting said upper edge portion of said door with the instrument panel.

* * * * *